United States Patent [19]
Quepóns Dominguez et al.

[11] Patent Number: 6,123,848
[45] Date of Patent: Sep. 26, 2000

[54] ULTRAFILTRATION METHOD FOR PURIFYING WATER-INSOLUBLE ALUMINUM HYDRATES

[75] Inventors: Rosa Isabel Quepóns Dominguez; Lance Eugene Solter, both of Chesterfield; Danny Thomas Lauff, Glencoe; John David Mitchell, St. Charles; Edward Charles Jantosik, Jr., St. Louis, all of Mo.; David Carl Woodward, Troy, Ill.

[73] Assignee: Warner-Jenkinson Company, Inc., St. Louis, Mo.

[21] Appl. No.: 09/011,321

[22] PCT Filed: Jul. 25, 1997

[86] PCT No.: PCT/US97/13237

§ 371 Date: Feb. 12, 1998

§ 102(e) Date: Feb. 12, 1998

[87] PCT Pub. No.: WO98/35746

PCT Pub. Date: Aug. 20, 1998

Related U.S. Application Data

[60] Provisional application No. 60/038,011, Feb. 14, 1997.

[51] Int. Cl.[7] .............................. B01D 61/14; B01D 61/22
[52] U.S. Cl. .......................... 210/651; 210/650; 210/739; 210/744; 210/746; 210/195.2
[58] Field of Search ..................................... 210/651, 650, 210/739, 744, 746, 195.2

[56] References Cited

U.S. PATENT DOCUMENTS

| Re. 28,940 | 8/1976  | Komline, Sr. et al. . |
|------------|---------|------------------------|
| 3,524,756  | 8/1970  | Signorino et al. .     |
| 3,576,663  | 4/1971  | Signorino et al. .     |
| 3,622,508  | 11/1971 | Komline .              |
| 3,667,614  | 6/1972  | Komline .              |
| 3,694,237  | 9/1972  | Piotrowski .           |
| 3,701,432  | 10/1972 | Schlegel .             |
| 3,723,712  | 3/1973  | Komline, Sr. et al. .  |
| 3,799,532  | 3/1974  | Schlegel .             |
| 3,803,806  | 4/1974  | Komline, Sr. et al. .  |
| 3,918,821  | 11/1975 | Schlegel et al. .      |
| 4,009,103  | 2/1977  | Burke .                |
| 4,276,176  | 6/1981  | Shorr .                |
| 4,336,244  | 6/1982  | Woznicki et al. .      |

(List continued on next page.)

FOREIGN PATENT DOCUMENTS 1359898   7/1974   United Kingdom .

*Primary Examiner*—W. L. Walker
*Assistant Examiner*—Richard W. Ward
*Attorney, Agent, or Firm*—Whyte Hirschboeck Dudek SC

[57] ABSTRACT

A process and apparatus for purifying water-insoluble particles is disclosed. The process comprises the steps of continuously recirculating a fluid aqueous suspension of the water-insoluble particles between a filtration system and a suspension reservoir; continuously conducting ultrafiltration of the recirculating suspension at the filtration system to separate an aqueous permeate containing the water-soluble impurities from the recirculating fluid aqueous suspension; continuously discharging the permeate generated by ultrafiltration; adding water to the recirculating fluid aqueous suspension undergoing ultrafiltration at approximately the same volumetric rate per hour as permeate is being discharged; monitoring the purity of the recirculating fluid aqueous suspension; and recovering the purified fluid aqueous suspension after the recirculating fluid aqueous suspension has reached a predetermined purity condition. An apparatus is also disclosed for carrying out the above process. Preferred water-insoluble particles may include lakes (particles with absorbed dye) and particles used to make lakes such as finely divided aluminum hydrate. Advantages of this invention include the ability to consistently produce high purity water-insoluble particles at low cost and with savings in manual labor. Purification according to this invention requires substantially less water than prior art methods, reducing purified water consumption and waste product disposal costs.

24 Claims, 8 Drawing Sheets

U.S. PATENT DOCUMENTS

| | | |
|---|---|---|
| 4,366,129 | 12/1982 | Czeglédi et al. . |
| 4,670,150 | 6/1987 | Hsuing et al. . |
| 4,676,959 | 6/1987 | The et al. . |
| 4,786,482 | 11/1988 | The et al. . |
| 4,801,381 | 1/1989 | Niesen . |
| 4,895,653 | 1/1990 | Cherochak . |
| 4,952,317 | 8/1990 | Culkin . |
| 4,986,911 | 1/1991 | Goron et al. . |
| 5,014,564 | 5/1991 | Culkin . |
| 5,049,233 | 9/1991 | Davis . |
| 5,141,610 | 8/1992 | Vaughan . |
| 5,198,085 | 3/1993 | Vaughan . |
| 5,244,583 | 9/1993 | Goron et al. . |
| 5,338,457 | 8/1994 | Capozzola et al. . |
| 5,455,019 | 10/1995 | Inui et al. . |

ULTRAFILTRATION METHOD FOR PURIFYING WATER-INSOLUBLE ALUMINUM HYDRATES

CROSS-REFERENCE TO RELATED APPLICATIONS

This application claims priority from provisional Application No. 60/038,011 filed on Feb. 14, 1997.

BACKGROUND OF THE INVENTION

1. Field of the Invention

This invention pertains to methods and apparatus for removing water-soluble impurities from water-insoluble particles. More particularly, this invention pertains to methods and apparatus that use filtration for purifying a fluid aqueous suspension may be containing water-soluble impurities.

2. Description of the Relevant Art

Water-insoluble particles sometimes have-uses which require the removal of water-soluble impurities. Such uses include use as a mordant in dyeing, an ion-exchanger, a filtering medium, a chromatography substrate, a printing ink, an antiperspirant, a dentifrice, a tablet filler, and others. For example, aluminum hydrate, also known as aluminum hydroxide, hydrated alumina, or aluminum trihydrate, may be used as a mordant in dyeing, an adsorbent, an emulsifier, an ion-exchanger, a filtering medium, an antacid, and an antihyperphosphatemic. Aluminum hydrate is also used in chromatography; in the manufacture of glass, fire clay, paper, pottery, printing inks, lubricating compositions, and detergents; for waterproofing fabrics; and in antiperspirants and dentifrices, among other applications.

Alumina hydrate and aluminum chloride are useful for making "lakes". "Lakes" are color additives prepared by combining a soluble dye with an insoluble substrate. Lakes made from aluminum compounds are generally thought to be coordination compounds of the aluminum compound with the dye. An aluminum lake is conventionally prepared by adding a base such as sodium carbonate or sodium hydroxide to a solution of aluminum sulfate to precipitate aluminum hydrate. That process generates sodium sulfate as a water-soluble byproduct, which is removed by pressing a filter cake and washing the filter cake in the filter press. A solution of colorant is added to the resulting slurry, which is acidified with hydrochloric acid to convert the colorant to an aluminum salt, which then absorbs onto the surface of the aluminum hydrate to form a lake. In that step, sodium chloride is formed as a water-soluble byproduct.

A lake may also be formed by adding a dye to an aluminum hydrate formed by adding aluminum chloride to a solution of sodium bicarbonate as described in U.S. Pat. No. 3,909,284, incorporated herein by reference. According to that patent, a dye dissolved in water is added to the resulting aluminum hydrate suspension and then a thin stream of aluminum chloride solution is added until the pH is between 4.1 to 4.3 to effect laking. An advantage of this process is-that it does not generate sulfate salts, but it still generates chloride salts as an intermediate byproduct.

The slurry formed by either lake making process is filtered and the filter cake is then washed, dried and ground to the appropriate fineness. The product is marketed as is, mixed with other lakes, mixed with approved diluents, or dispersed in edible vehicles or other media that make the mixtures appropriate for printing food wrappings, marking capsules, coloring health and beauty products that come in contact with the skin, coloring products intended for human consumption, etc.

When the colorants used to make lakes are intended for human contact or consumption, they are generally required to be "certified" by an appropriate government agency. In the U.S., that agency is the U.S. Food & Drug Administration (the FDA). U.S. certified colorants are generally referred to as FD&C (Foods, Drugs and Cosmetics) and D&C (Drugs and Cosmetics) colorants. Other entities which certify colorants include the European Economic Community (E.E.C), the World. Health Organization (W.H.O.), and most developed countries. Alternative substrates for making "lakes" approved in some countries, include blanc fixe, gloss white, clay, titanium dioxide, zinc oxide, talc, rosin, aluminum benzoate, calcium carbonate, and combinations thereof.

The need for removal of the water-soluble salts generated at each step of the "lake" manufacturing process is a serious problem, because copious amounts of water has been required to wash sodium sulfate from the aluminum hydrate and wash sodium chloride and non-absorbed dye from the lake. The presence of sulfates interferes with absorption of the dye on the hydrate base and the presence of sodium chloride and excess dye in the lake can reduce water-resistance and resistance to color bleed.

The current industry practice for purifying such water-insoluble substrates and "lakes" prepared from them is a batch process that utilizes a plate and frame filter press. A fluid aqueous suspension of particles is dewatered by passing it through a filter press. The filter press cake is then washed with purified water while in the press until the level of dissolved salts in the filtrate, as measured by a conductivity meter, is reduced to a satisfactory level. The inventors have found that a disadvantage of this process is that the filter cake often forms "channels" or "short circuits" for the passage of water through the cake during washing, preventing the water from effectively cleansing the entire filter cake. This results in an ineffective wash and a lower quality batch containing a higher content of impurities when it is reslurried. Refiltering the reslurried filter cake requires additional time and labor, increasing production costs.

A need therefore exists for an improved process for purifying fluid aqueous suspensions of water-insoluble particles containing water-soluble impurities. Specifically, a process is needed which is capable of producing commercial amounts of high purity water-insoluble particles in less time and/or labor than conventional methods. Such a process should be as economical or more economical than conventional methods. The process should use as little water as possible to achieve a given purity level to reduce the cost of generating purified wash water and, at the same time, reduce the cost of safely disposing of or recycling impurity-containing filtrate. Furthermore, such a process should be reliable and require a low degree of maintenance. These and other objectives are attained by the present invention.

BRIEF SUMMARY OF THE INVENTION

One aspect of the present invention is a method for purifying a fluid aqueous suspension of particles containing one or more water-soluble impurities comprising:

A. continuously recirculating the fluid aqueous suspension between a filtration system and a suspension reservoir;

B. continuously conducting ultrafiltration of the recirculating suspension at the filtration system to separate an aqueous permeate containing the water-soluble impurities from the recirculating fluid aqueous suspension;

C. continuously discharging the permeate generated by step B;

D. adding water to the recirculating fluid aqueous suspension undergoing ultrafiltration at approximately the same volumetric rate per hour as permeate is being discharged according to step C;

E. monitoring the purity of the recirculating fluid aqueous suspension; and

F. recovering the purified fluid aqueous suspension produced by steps A through D after the suspension has reached a predetermined purity condition monitored according to step E.

Another aspect of this invention is an apparatus for purifying a fluid aqueous suspension of particles containing at least one impurity comprising:

A. a reservoir for holding a fluid aqueous suspension;

B. a filtration system comprising at least one ultrafiltration membrane connected in recirculating communication with the reservoir for separating an aqueous permeate containing water-soluble impurities from a fluid aqueous suspension;

C. a pump connected between the reservoir and the filtration system for pumping a fluid aqueous suspension from the reservoir to the filtration system;

D. an inlet in fluid communication with the pump for introducing water to a fluid aqueous suspension;

E. an outlet in fluid communication with the filtration system for removing the aqueous permeate from the filtration system; and F. a water-injection control device in fluid communication with the inlet which is capable of automatically controlling the hourly rate of introduction of water through the inlet into a fluid aqueous suspension to approximate the hourly volumetric rate of discharge of a permeate from the filtration system through the outlet.

BRIEF DESCRIPTION OF THE DRAWING

Preferred exemplary embodiments of the invention are illustrated in the accompanying drawings in which like reference numerals represent like parts throughout, and in which.

DETAILED DESCRIPTION OF THE INVENTION

Figure 1:
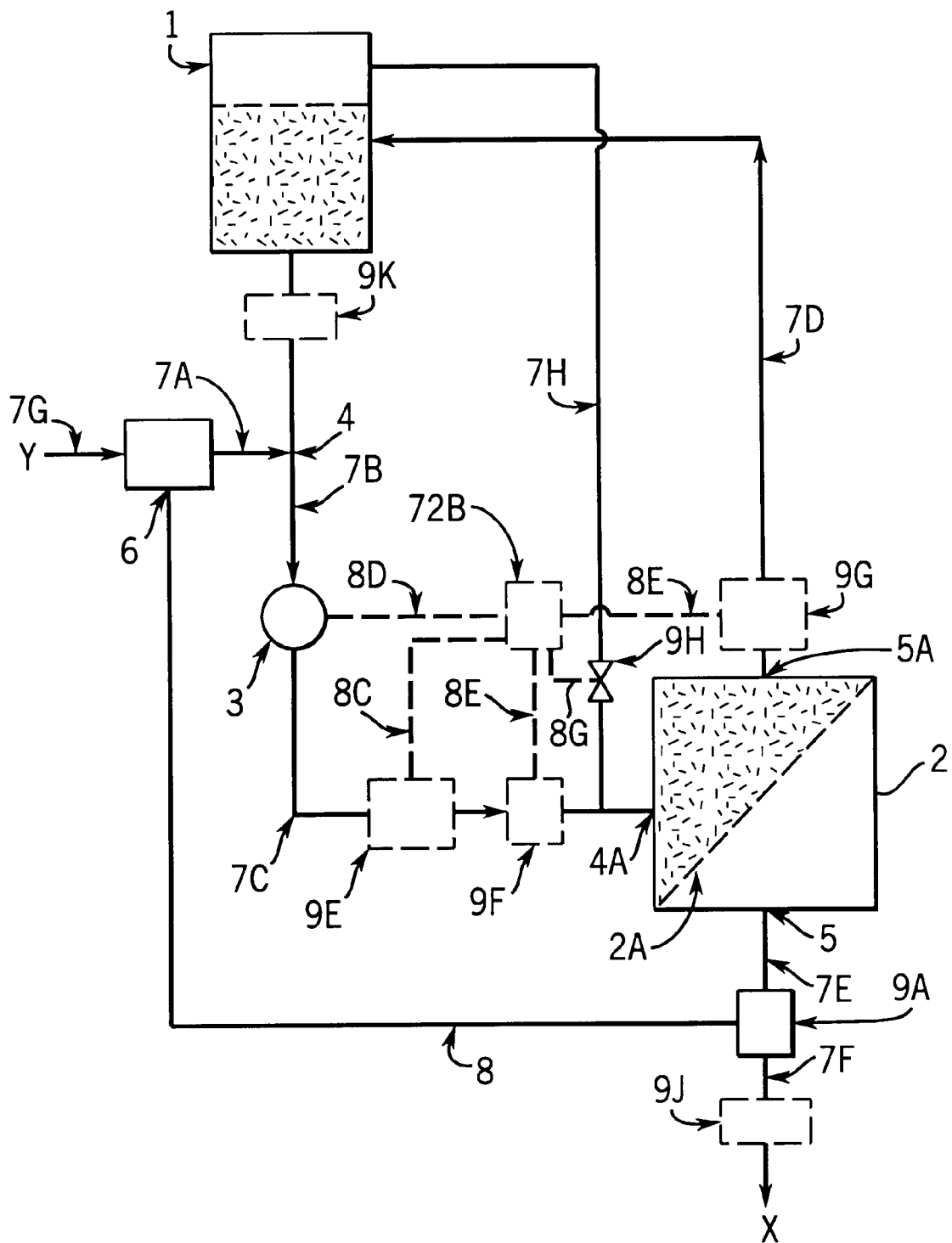
FIG. 1 is a block diagram of one embodiment of an apparatus according to the present invention having a monitoring device 9A at the permeate outlet 5.

The term ultrafiltration refers to the process of separating a liquid into fractions by pressure-driven flow through semi-permeable membranes having molecular weight cut-offs in the range from 200 to 350,000 and pore diameters from about 10 to 1000 Angstroms. The semi-permeable membranes useful for ultrafiltration are referred to herein as "ultrafiltration membranes". The fraction which passes through the membranes is known as the "permeate" and the other fraction which is retained in the base liquid stream is known as the "retentate". The retentate does not pass through the membrane(s), but rather passes by the membrane(s) tangentially. In the method of this invention, the fluid aqueous suspension flowing from the filtration system to the reservoir corresponds to the retentate.

Several types of apparatus are known for carrying out the ultrafiltration step of this invention. One type is known as "plate and frame" ultrafiltration in which a series of plates support semipermeable membranes and the base liquid stream is passed across those membranes. Another is the "spiral membrane" apparatus in which the membrane is wrapped in a perforated collection tube and the base liquid stream is passed through the length of the tube. Several others are known. Preferred apparatus include the plate and frame type apparatus described in U.S. Pat. No. 4,801,381, incorporated herein by reference, which is commercially available from Komline-Sanderson Engineering Corporation of Peapack, N.J., as the Komline-Sanderson Membrane System (KSMS). These devices are designed to create shear forces near the boundary layer of the semi-permeable membranes(s) by forcing the fluid to pass tangentially across the working surface of the membrane(s) at high velocity and low resistance to reduce plugging or clogging of the membrane(s).

Another type is the "vibratory" filtration system. That system generates shear forces at the surface of the semi-permeable membrane by vibrating (i.e., oscillating) the semi-permeable membrane in a direction normal to the direction of flow of the fluid passing through it. The term Vibratory Shear Enhanced Processing (V-SEP™) has been coined for that method of filtration. Apparatus for applying that method are described in U.S. Pat. No. 4,952,317, incorporated herein, by reference, and are commercially available from New Logic International of Emeryville, Calif. The V-SEP™ type apparatus is preferred, especially for purifying lakes according to this invention.

Semi-permeable membranes for ultrafiltration are available commercially from various manufacturers, including Desalination Systems, Inc., and Advanced Membrane Technology. The membranes are preferably made of a polymer such as polysulfone or polyvinyl. The molecular weight cutoffs depend on the average particle size of the suspension particles. Molecular weight cutoffs are preferably at least 10,000, more preferably at least 50,000, up to 350,000. In one embodiment, the molecular weight cutoff is 100,000. The membrane pore size is preferably smaller than 99 percent, more preferably 99.9 percent, even more preferably 100 percent, of the particles in the suspension.

The membranes are preferably used with a drain cloth between the membrane and the membrane support. A drain cloth is defined herein as a cloth-like material having less resistance to suspension flow than the ultra-filtration membrane. A preferred drain cloth is made of polypropylene such as 3121 TYPAR (spunbonded polypropylene drain cloth) commercially available from Reemay.

The method of this invention can be carried out with suspensions containing a wide range of water-insoluble particulate materials. Water-insoluble means that less than 5 weight percent, more preferably less than 1 weight percent, even more preferably less than 0.5 weight percent, of the particles is soluble in water at the operating pH and temperature of the method of this invention. The operating pH is preferably 7±0.5. Examples of such particle materials include, but are not limited to, aluminum hydrate; blanc fixe; gloss white; clay; titanium dioxide; zinc oxide; talc; resin; aluminum benzoate; calcium carbonate; water-soluble powders of cellulose, such as microcrystalline cellulose; cellulose, derivatives, such as ethyl cellulose; starch; starch derivatives; any combination of two or more of these materials; and these materials having at least one dye absorbed or adsorbed thereon.

Preferred dyes include those which are approved for use in foods, drugs or cosmetics, because the benefits of the invention add significant value to lakes destined for such uses. In a preferred embodiment, the particle material is a lake made from one or more of the above particle materials, such as aluminum hydrate particles, and a government approved or certified color. Useful certified water-soluble dyes include those approved for food drug and/or cosmetic use by the U.S. Food and Drug Administration, some of which are described in U.S. Pat. Nos. 3,524,756; 3,576,663; 3,694,237; 3,909,284 and 4,336,244, which are incorporated herein by reference. Examples include U.S. certified dyes listed in Table I below.

TABLE I

| Color | Common Name | U.S. (F)D&C Designatin | CAS Reg. No. |
|---|---|---|---|
| Red | Erythrosine | Red No. 3 | 16423-68-0 |
| | Ponceau SX | Red No. 4 | 4548-53-2 |
| | Lithol Rubin B | Red. No. 6 | 5858-81-1 |
| | Eosin Y | Red. No. 22 | 17372-87-1 |
| | Tetrabromotetra-chlorofluorescein | Red. No. 27 | 13473-26-2 |
| | Phloxine B | Red. No. 28 | 18472-87-2 |
| | Helindone Pink CN | Red No. 30 | 2379-74-0 |
| | Allura Red | Red No. 40 | 25956-17-6 |
| Yellow | Tartrazine | Yellow No. 5 | 1934-21-0 |
| | Sunset Yellow FCF | Yellow No. 6 | 2783-94-0 |
| | — | Yellow No. 10 | 8004-92-0 |
| Green | Fast Green FCF | Green No. 3 | 2353-43-9 |
| Blue | Brilliant Blue FCF | Blue No. 1 | 3844-45-9 |
| | Indigotine or Indigo Carmine | Blue No. 2 | 860-22-0 |

Further information regarding these and other useful colorants certified by the U.S. FDA may be found in Marmion, *Handbook of U.S. Colorants,* 3rd edition (John Wiley & Sons, 1991), which is incorporated herein by reference.

Useful examples of EEC certified colorants are presented in Table II:

TABLE II

| Color | Common Name | E.E.C. Designation | CAS Reg. No. |
|---|---|---|---|
| Red | Carmoisine | E. 122 | 3567-69-9 |
| | Amaranth | E. 123 | 915-67-3 |
| | Ponceau 4R | E. 124 | 2611-82-7 |
| Yellow | Quinoline Yellow | E. 104 | 8004-72-0 |
| Green | Green S | E. 142 | 860-22-0 |
| Blue | Patent Blue V | E. 131 | 33536-49-0 |
| Brown | Brown HT | E. 156 | 4553-89-3 |
| Black | Brilliant Black BN | E. 151 | 2519-30-4 |

The method of this invention is also useful with uncertified dyes and/or dyes made from natural extracts. An example of a dye derived from nature is Cochineal Extract, which is extracted from a Peruvian beetle.

In a preferred embodiment, the method of this invention is carried out with a suspension containing aluminum hydrate. Aluminum hydrate suspensions are well known in the art. Methods for making aluminum hydrate suspensions are described above in the Background of the Invention. The method of this invention is useful for removing salts, such as salts produced as a byproduct of making aluminum hydrate, as impurities from the suspension.

A lake made from aluminum hydrate particles may be referred to as an aluminum lake. The procedure for making an aluminum lake is well known in the art. A well known procedure is to acidify a mixture of aluminum hydrate particles and water-soluble dye with hydrochloric acid to be deposited on and absorbed by the aluminum hydrate particles. To efficiently carry out this process, a purified aluminum hydrate suspension is preferred, such as an aluminum hydrate suspension purified according to the method of this invention, particularly if the aluminum hydrate is prepared from an aluminum sulfate.

Even with a purified aluminum hydrate suspension, the lake making process forms chloride salts, primarily sodium chloride, which are dissolved in the aqueous phase of the suspension and there is usually residual dye left over which was not absorbed by the substrate. The method of this invention may be used to remove such salts and excess dye as impurities. After the lake is purified, it is typically dried using conventional procedures known in the art.

The number average particle size of the particles in suspension may vary over a wide range. Preferably, the number average particle size is small enough to be in the colloidal range (i.e., less than 5,000 Angstroms), because that avoids difficulties that could arise with larger particles settling out of the suspension. The minimum particle size may vary over a wide range, but preferably at least 99 percent of the number of particles have a particle size greater than, more preferably at least twice, the average pore size of the filtration system membrane(s), more preferably at least 99.9 percent.

The suspension may contain a surfactant to assist in maintaining the particles in suspension and/or reduce particle agglomeration. When the suspension is ultimately intended for food, drug or cosmetic use, surfactants approved for such use in such products are preferred. One such surfactant is Ultrasil™, which is commercially available from Klenzade, a division of Ecolab, Inc., of St. Paul, Minn.

The water added in step D may be ordinary tap water, but it is preferably water which is substantially free of the water-soluble impurities monitored in step E. The water preferably has less than 3,500 ppm, more preferably less than 320 ppm, of the water-soluble impurities, and/or the water preferably has a conductivity less than 1,000 microSiemans/cm ($\mu$S/cm) more preferably less than 600 $\mu$S/cm., even more preferably less than 400 $\mu$S/cm., and even more preferably less than 350 $\mu$S/cm. The preferred substantially free of impurities water may, for example, be obtained by distillation or reverse osmosis.

The water may be injected at any point in fluid communication with the recirculating suspension, such as into the reservoir or into any of the system conduits. Water is preferably injected between the reservoir and the pump that urges the suspension into the filtration system. The inventors found that the vigorous mixing of the water with suspension via the pump enhances the efficiency with which impurities are released from the particles into the water and the presence of added water in the pump helps disperse agglomerations of particles that might otherwise clog or plug the membrane(s). The hourly volumetric rate of water addition preferably averages within 20 percent, more preferably within 10 percent, and even more preferably within 5 percent, of the hourly volumetric permeate discharge rate over a given time period. The given time period is preferably over 20 percent, more preferably over 50 percent, even more preferably over 80 percent, of the time required reach the predetermined purity condition of step F from when water is first added according to step D. The water may be added discontinuously, with at least 1, more preferably at least 4, even more preferably at least 12, discontinuous addition(s) per hour, and/or the water may be added in one continuous metered addition.

In a preferred embodiment, the volumetric rate of water addition per minute averages within 20 percent, more preferably within 10 percent, even more preferably within 5 percent, of the volumetric permeate discharge rate over a given time period as defined above. Preferably, water is added according to step D for at least 50 percent, more preferably at least 80 percent, of the total time steps A to E are carried out until the predetermined purity condition of step F is satisfied. The weight-ratio of the total amount of water added to the recirculating fluid aqueous suspension to reach the predetermined purity condition of step F to the total weight of the particles in the same is preferably less than 90:1, more preferably less than 50:1, and even more preferably less than 30:1.

The amount of water required to achieve a given purity level depends on the stringency of the purity level and the purity of the water used to purify. Such weight ratios of the amount of water added to the total weight of particles in the recirculating suspension may be achieved when the method is used to obtain as high as a 35,000 $\mu$S/cm reduction in conductivity of the permeate in less than or equal to 10 hours for a final conductivity as low as 2,000 $\mu$S/cm with water having a conductivity of less than 600 $\mu$S/cm, preferably less than 400 S/cm.

Monitoring the purity of the permeate according to step E may be carried out using any conventional apparatus for detecting the water-soluble impurities. When the water-soluble impurities to be removed are ionic salts, the presence of that impurity can be monitored using a conventional conductivity meter. When the water-soluble impurity to be monitored is a light-absorbing moiety such as a dye, the monitoring device may be a suitable device such as a spectrometer detector. Preferably, the predetermined purity condition of step F is less than 3,500 ppm, more preferably less than 320 ppm, impurity. When purity monitoring is based in conductivity, the predetermined purity condition of step F is preferably less than 2,000 $\mu$S/cm, more preferably less than 1,200 $\mu$S/cm, even more preferably less than 600 $\mu$S/cm, and even more preferably less than 400 $\mu$S/cm. The concentration of impurities in the suspension is preferably reduced by at least 10,000 ppm in less than or equal to 20 hours, more preferably less than or equal to 10 hours, and even more preferably in less than or equal to 8 hours. When the concentration of impurities in the suspension is monitored by monitoring conductivity, the conductivity is preferably reduced by 35,000 $\mu$S/cm in less than or equal to 10 hours, more preferably in less than or equal to 8 hours. Lakes sometimes take two to three times longer to purify. The purity of the suspension may be monitored directly, or indirectly by monitoring the purity of the permeate being discharged. Monitoring the permeate purity is preferred from a practical standpoint, since the permeate is less likely to contain materials that might interfere with or clog up the monitoring device.

Typical impurities removed by the method of this invention are water-soluble salts, such as salts of metals from Group I of the Periodic Table. In one embodiment, sodium and potassium salts comprise at least 40 weight percent, preferably at least 80 weight percent, even more preferably at least 95 weight percent, of the impurities removed from the suspension. Examples of sodium and potassium salts are sodium sulfate, potassium sulfate, sodium chloride and potassium chloride, which may be present in aluminum hydrate suspensions, and sodium and potassium chloride, which are common impurities in aluminum lakes as a byproduct of aluminum lake production.

In one preferred embodiment, dye is added to an appropriate suspension of particles in the suspension reservoir used to purify the resulting lake. The suspension in the suspension reservoir may undergo purification and/or a concentration step as explained below prior to adding the dye. The steps for making a lake (i.e., "laking") may also be carried out in the suspension reservoir.

To optimize the efficiency of the method of this invention for a given equipment capacity, the method is preferably carried out on a suspension in which the particle concentration is as high as it can be while keeping the suspension particle concentration within a range that the filtration system can handle the pressure from the pump and clogging and/or plugging of the filtration system membranes is minimized. In a preferred embodiment, the suspension has a solids concentration less than 14 percent for a static system like the KSMS and less than 16 percent for an oscillating system such as V-SEP™. When the filtration system has stationary plates, the weight percent solids in the suspension is preferably less than 14 percent for a filtration system with stationary membranes, more preferably less than about 10 percent and even more preferably less than about 8 percent. In one embodiment, the preferred range is from 5 to 10 percent, more preferably 6 to 8 percent. When the filtration subjects the membrane(s) to oscillatory motion, the weight percent solids is preferably less than 16 percent and more preferably less than 12 percent, and even more preferably less than 10 percent. In one embodiment, the preferred range is from 5 to 12 percent, more preferably from 8 to 10 percent. For high throughput, a solids concentration in the range from 4 to 11 percent, more preferably 5 to 10 percent, is preferred.

The particle concentration of the suspension can be increased to a desired level before purifying the suspension according to this invention by conducting steps A to C of this invention while adding water at a volumetric rate less than approximately the same rate as permeate is being discharged according to step C for a given time period, the former preferably being at a rate of zero. The endpoint of the suspension particle concentration adjustment may be determined based on measuring the volume of suspension remaining in the reservoir, dividing that value by the original volume and multiplying by the original percent solids; measuring the volume of permeate removed from the suspension, subtracting the amount of water added, subtracting the resulting value from the original volume of the suspension, dividing the resulting value by the original volume and multiplying by the original percent solids; or by measuring the mass flow per unit volume with a mass flow meter in fluid communication with the recirculating fluid aqueous suspension and, if necessary, correlating the reading obtained from such a device to the particle concentration of the recirculating suspension. The original (and subsequent) percent solids of the suspension may be measured by a method such as an ASTM procedure for measuring solids, or by calculating the amount of solids from the amount of starting materials used to make the particles in suspension. Steps D to F may be added at any time purification is desired such as either before or after concentrating the suspension according to this invention. By the same token, the suspension can be diluted by adding water at a volumetric rate greater than the volumetric rate of permeate discharge for a given time period.

After the predetermined purity level is attained and prior to recovery of the purified suspension according to step F, the recirculating fluid aqueous suspension may be further concentrated or diluted using the above techniques (decreasing or increasing the volumetric rate of water addition, respectively, relative to the volumetric rate of permeate discharge) until the desired particle concentration is achieved. When the product is to be dried, a high particle concentration is generally desired.

To prevent plugging or clogging of the ultrafiltration membranes, the inventors have found that certain conditions for conducting this process are preferred. When the membranes are stationary relative to the flow of the recirculating suspension, the tangential velocity of the suspension relative to the membranes is preferably at least about 9.5 ft/second, more preferably at least 10.2 ft/second and even more preferably at least 10.6 ft/second. The tangential velocity in such stationary systems is achieved by adjusting the flow rate of the suspension through the filtration system, usually by controlling the speed of a recirculating suspension flow pump. When the membranes are subjected to oscillatory motion relative to the flow of the recirculating suspension, the flow rate of the suspension through the filtration system becomes less important, and the amplitude and rate of oscillation becomes more important. The oscillation amplitude is preferably at least 0.75 inch, more preferably at least 1.0 inch, and the frequency of oscillation is preferably at least 45 cycles/ second, more preferably at least 55 cycles/second.

The inventors have also found that certain other conditions may affect performance and efficiency. A suspension temperature range of 5 to 35 C. is preferred, and operation within a temperature range of 18 to 30 C. is typically even more preferred. It is also preferable that the suspension be agitated while it is in the reservoir and the suspension is preferably passed through a screen or filter before it enters the filtration system to further safeguard against passing particle agglomerations or other larger solid impurities into the filtration system.

Another aspect of this invention is an apparatus for purifying a fluid aqueous suspension of particles. A preferred embodiment of the apparatus of this invention is shown in FIG. 1. FIG. 1 shows reservoir 1 connected in recirculating fluid communication with filtration system 2 having ultrafiltration membrane 2A and suspension inlet 4A and suspension outlet 5A. Pump 3 is connected between reservoir 1 and filtration system 2 for pumping a fluid aqueous suspension of particles from reservoir 1 to filtration system 2. Pump 3 is preferably a centrifugal pump. Inlet 4 is provided for introducing water y to a fluid aqueous suspension drawn from reservoir 1 by pump 3. Outlet 5 is provided for removing the aqueous permeate x from filtration system 2. The aforementioned connections are preferably conduits 7A through 7D. A purity monitoring device 9J, such as a conductivity meter and/or spectrometer, is connected to filtration system 2, in this case via flow meter 9A and conduits 7E and 7F, in a preferred embodiment of this invention.

Water injection control device 6 is provided to automatically control the volumetric rate of introduction of water to a suspension through inlet 4 to approximate the volumetric rate of discharge of a permeate from filtration system 2 through outlet 5. It is connected in fluid communication with inlet 4 between a source of water y and inlet 4, preferably by conduits 7G and 7A.

Control device 6 can rely upon a variety of feedback to regulate the flow of water. Examples include mechanical feedback, pneumatic feedback, hydraulic feedback, and electrical feedback including, but not limited to, movement and/or signals that correlate to the flow rate of the permeate, known as permeate flux. Mechanical, pneumatic, hydraulic or electrical feedback includes a mechanical, hydraulic or electrical connection 8 between permeate flow meter 9A connected in fluid communication with the permeate outlet 5 by conduit 7E and water injection control device 6 to adjust the hourly water injection rate to correspond to the hourly permeate flow rate. A mechanical connection may include, for example, a shaft connecting a positive displacement flow meter as the permeate flow meter 9A and a positive displacement flow meter as the water injection control device 6, wherein water y is preferably under a pressure greater than the pressure of the fluid aqueous suspension in connection 7B between reservoir 1 and pump 3. Pneumatic feedback includes a permeate flow meter at the permeate outlet 5 connected to a pneumatic device capable of generating an air signal corresponding to the volumetric flow rate registered by the permeate flow meter 9A which is pneumatically connected by connection 8 to water injection control device 6, such as a pneumatically controlled valve or positive displacement pump. The hydraulic feedback includes a system analogous to the aforementioned pneumatic system, except that hydraulic fluid is used instead of air.

When electrical signals are used, the signals which correlate to flow rate may be generated by any suitable flow meter, such as a volumetric flow meter or mass flow meter, which is in fluid connection with the appropriate part of the apparatus of this invention. Examples of flow meters include magnetic flow meters and paddle-type flow meters. The signals generated by the flow meters may be analog or digital. Preferably the signals are digital, or converted from analog to digital, and processed by a computer. In one embodiment shown in FIG. 1, permeate flow meter 9A is capable of generating an electrical signal corresponding to the rate of permeate flow. The electrical signal from that flow meter is electrically connected by electrically conductive connection 8 to the water injection control device 6. As shown in FIG. 9A, this water injection control device 6 may include flow control device 70 for controlling the rate at which water is injected into the recirculating suspension via the inlet 4, (of FIG. 1) such as an electrically-operated valve, and water flow meter 71 for measuring the rate with which water is injected, both of which are in fluid communication with each other and inlet 4 (FIG. 1). Control over the water injection rate is provided by an electrical control device 72 capable of comparing the relative flow rates measured by the permeate flow meter device 9A, which may be a flow meter capable of generating an electrical signal corresponding to flow rate, and the water injection flow meter 71 and adjusting the water flow control device 70 to increase or decrease the water injection rate to compensate for flow rate differentials between the respective flow meters 9A of FIG. 1 and 71 so as to maintain the particle concentration in the recirculating suspension at an approximate steady state.

Figure 7:
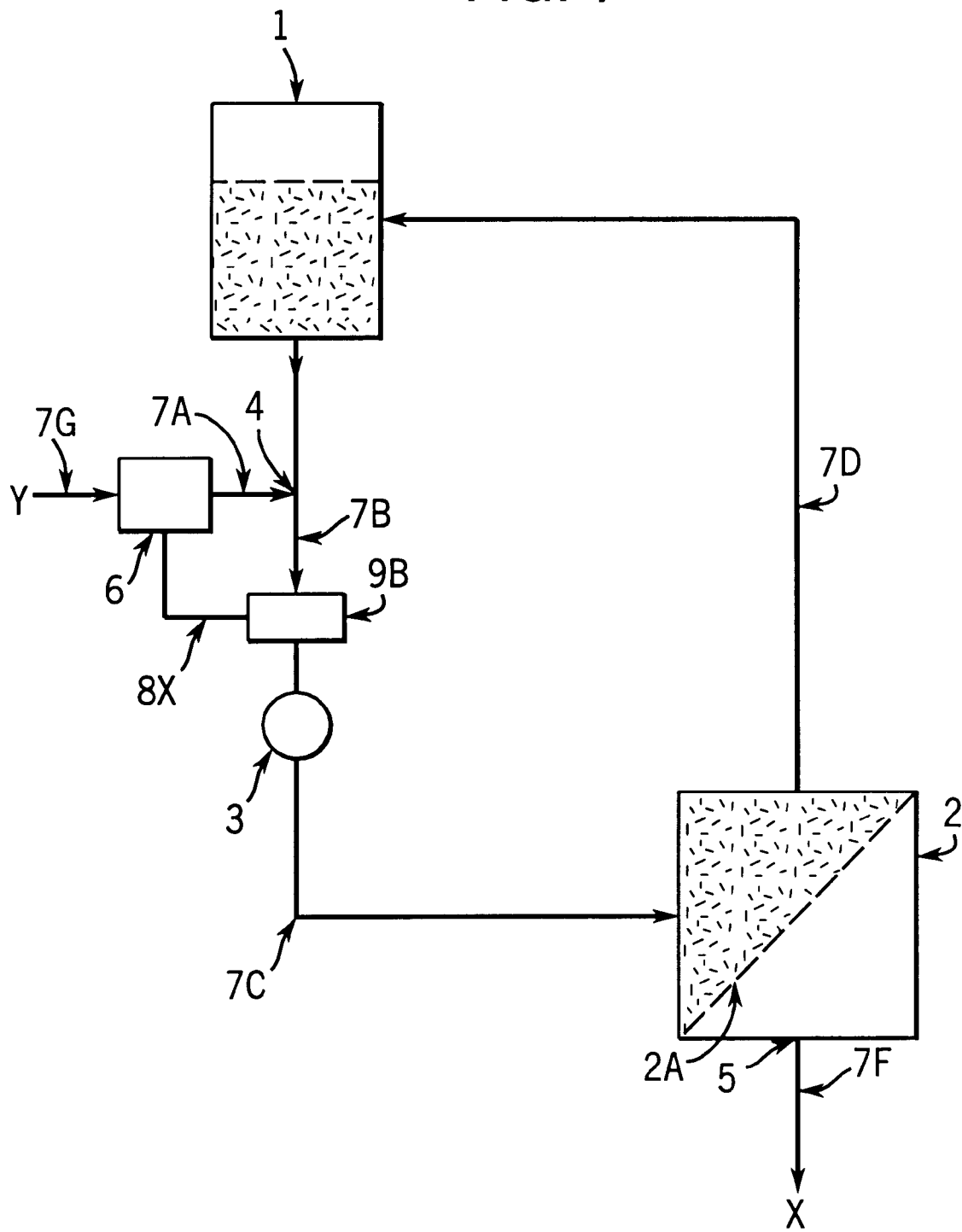
FIG. 7 is a block diagram of another embodiment of an apparatus according to the present invention having a monitoring device 9B in fluid communication with a recirculating fluid aqueous suspension.

In another embodiment shown in FIG. 7, water injection control device 6 is electrically connected to a mass flow meter 9B connected in fluid communication with the recirculating suspension which is capable of generating electrical signals corresponding to the mass flow rate and volumetric flow rate of the recirculating suspension transmitted to water injection control device 6 by electrical conductor connection 8X. As shown in FIG. 9A, water injection control device 6 may comprise electrical control device 72 which compares the mass flow rate signal with the volumetric flow signal and adjusts water flow control device 70 to increase or decrease the water injection rate to compensate for a corresponding change in particle concentration (i.e., increasing the volumetric water injection rate when the electrical control device senses an increase in particle concentration due to a higher mass flow relative to the volumetric flow of the recirculating suspension measured by the mass flow meter 9B of FIG. 7 and vice versa).

Figure 8:
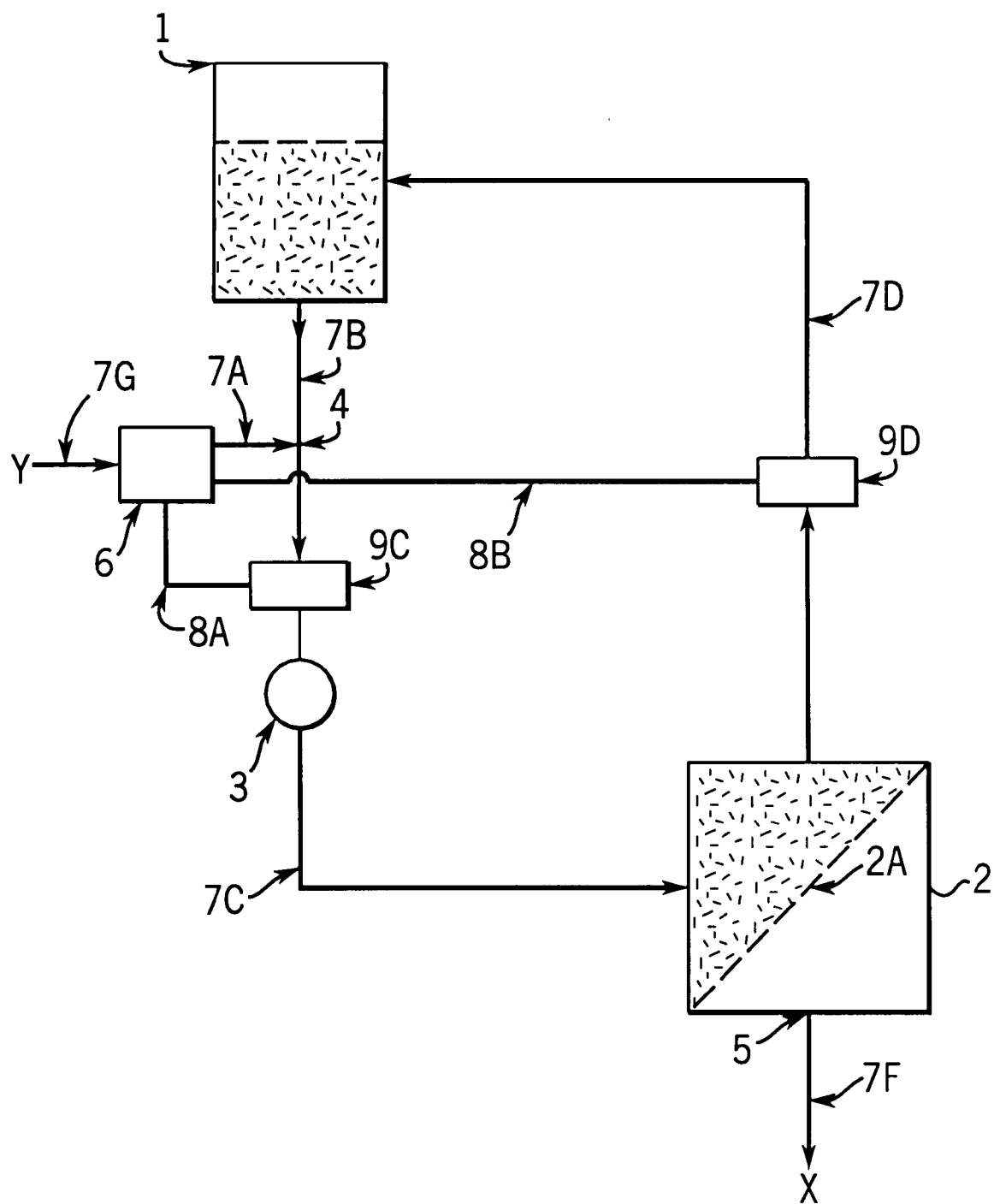
FIG. 8 is a block diagram of yet another embodiment of an apparatus according to the present invention having monitoring devices 9C and 9D in fluid communication with a recirculating fluid aqueous suspension.

In yet another embodiment, shown in FIG. 8, the water injection control device 6 is connected to flow meter 9C in fluid communication with the reservoir 1 in the connection between reservoir 1 and the filtration system 2 in which the recirculating suspension is urged forward by pump 3 from reservoir 1 to filtration system 2 and a second flow meter 9D is connected in fluid communication with the reservoir 1 between the filtration system 2 and reservoir 1 where recirculating suspension exits filtration system 2. In a preferred embodiment shown in FIG. 9B, water injection control device 6 comprises an electrical control device 72A which is capable of comparing the signals received from flow meter 9C and flow meter 9D (both of FIG. 8) over electrical connections 8A and 8B, respectively, to determine the flow rate of permeate exiting the filtration system through outlet 5 (FIG. 8) and adjusting the flow rate of water through water inlet 4 (FIG. 8) to increase or decrease the flow rate to correspond to changes in differential flow rate between the flow rate measured by flow meter 9C (FIG. 8) and that measured by flow meter 9D (FIG. 8).

Figure 9:
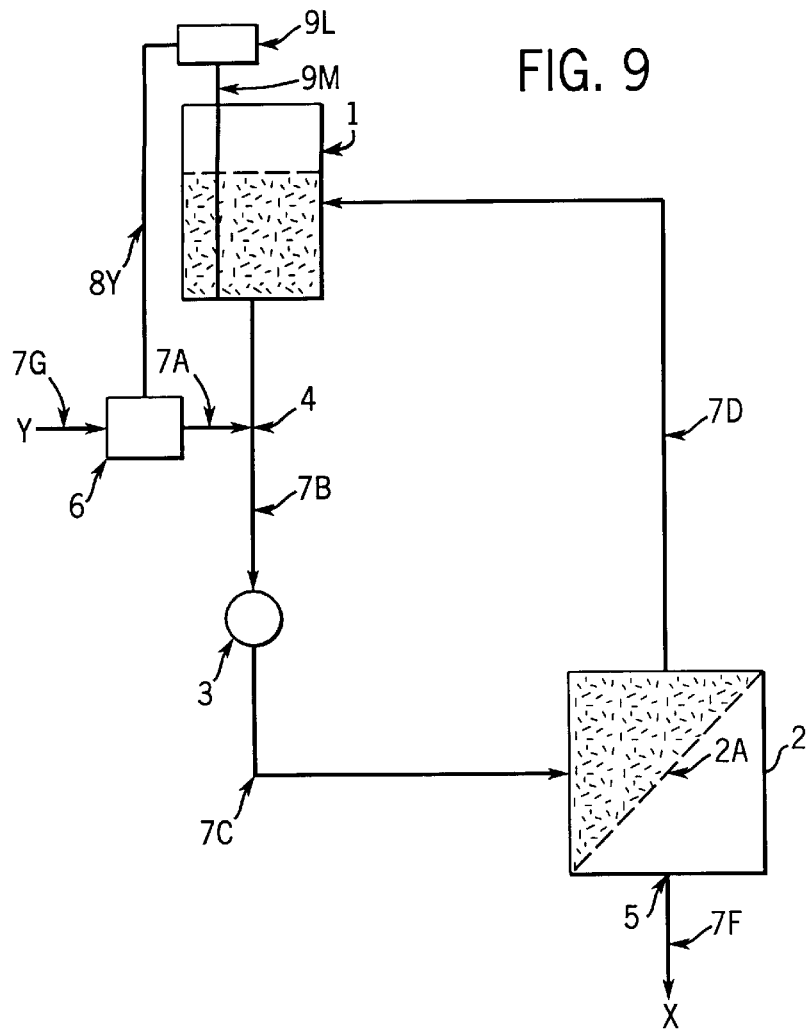
FIG. 9 is a block diagram of yet another embodiment of an apparatus according to this invention having monitoring device 9L for monitoring the volume of recirculating fluid aqueous suspension in reservoir 1 via probe 9M.
Figure 9A:
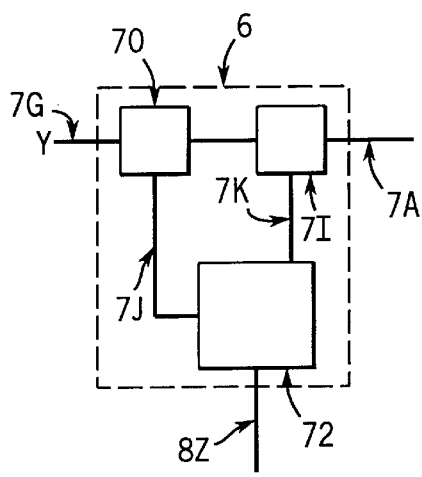
FIG. 9A is a block diagram of a water injection control device 6 useful for the embodiments of the invention shown in FIGS. 1, 7, and 9.

In yet another embodiment, shown in FIG. 9, the water injection control device 6 is connected to a monitoring device by connection 8Y wherein the monitoring device is a fluid level measuring device 9L in reservoir 1 for measuring the level of a recirculating fluid aqueous suspension in the reservoir. The fluid level measuring device 9L is capable of generating a signal corresponding to the volume of recirculating fluid aqueous suspension in reservoir 1, and the water-injection control device 6 is capable of adjusting the rate of water-injection into a recirculating fluid aqueous suspension in response to signals from the fluid level measuring device to maintain an approximately constant volume of recirculating fluid aqueous suspension in the reservoir. The fluid level measuring device 9L has a probe 9M for sensing the fluid level. The probe may operate mechanically (e.g., flotation), electrically, optically and/or acoustically.

Figure 9B:
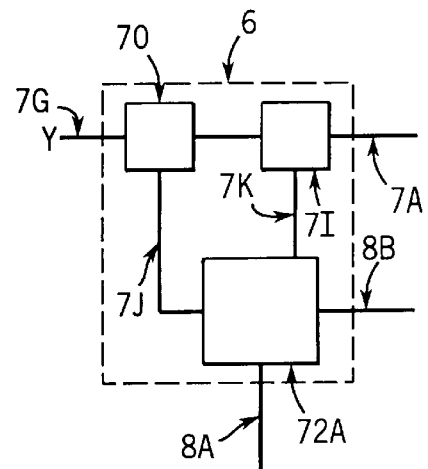
FIG. 9B is a block diagram of a water injection control device 6 useful for the embodiment of the invention shown in FIG. 8.

In FIGS. 9A and 9B, water control device 70 may be an electrically operated flow control valve or a water injection pump with electronic speed control. The order of water flow control device 70 and water flow meter 71 between water source y and inlet 4 may be reversed. In one embodiment, control device 72 of FIG. 9A or control device 72A of FIG. 9B is a digital computer programmed to carry out the required functions equipped with analog-to-digital and digital-to-analog converters when necessary for digital processing of analog electrical signals. Digital computers which may be used include programmable logic controllers (PLCs), which are commercially available from The Allen Bradley Co., Siemans Corp., Telemechanique, Mitsubishi Corp., General Electric, and Omron, among others. PLCs may be connected to a computer, such as a personal computer, programmed to interact with the PLC.

In one embodiment and referring now to FIG. 9A flow meters 9A (from FIG. 7) and 71 generate electric pulses at a rate corresponding to the rate of flow. The electric pulses are conducted to control device 72 by electrically conductive connections 8Z and 7K. Control device 72 comprises an analog-to-digital converter which counts the number if pulses per unit of time and assigns a digital numeric value to that number. Control device 72 samples or receives the digital numeric values from the analog-to-digital converter at regular time intervals, preferably not greater than one minute, more preferably not greater than 1 second, and compares the numeric value for flow meter 9A with the numeric value for flow meter 71. When the digital numeric value corresponding to permeate flow meter 9A flow rate is greater than that corresponding to water flow meter 71, control device 72 generates a signal through electrically conductive connection 7J to electrically operated valve 70 to further open valve 70 to allow more water to pass per unit time. When the digital value corresponding to permeate flow meter 9A flow rate is less than that corresponding to water flow meter 71 flow rate, the control device generates a signal to electrically operated valve 70 to further constrict the flow of water. The signal to electrically operated valve 70 may be transmitted via a digital-to-analog converter. In this embodiment, electrically operated valve 70 and water flow meter 71 may be replaced by a positive displacement pump which generates an electrical signal or pulse corresponding to the water displacement rate. In that case, control device 72 controls the rate of water displacement by the pump.

In FIG. 1, optional, and generally preferred, suspension flow meter 9E connected in fluid communication between pump 3 and filtration system 2 provides speed control feedback to pump 3 for maintaining an appropriate flow rate for the recirculating suspension through filtration system 2. It is connected to pump 3 by control lines 8C and 8D via optional control device 72B capable of comparing the flow rate measured by flow meter 9E with a preset flow rate value and adjusting the speed of pump 3 to approximate the preset flow rate value. Suspension flow meter 9E and any associated control device 72B may not be necessary if the flow rate can be estimated by monitoring the revolutions per second and, if applicable, power consumption, of pump 3, particularly when the filtration system 2 is the oscillatory type which generally requires less accurate control of the recirculating suspension flow rate than the stationary type.

Optional pressure measuring device 9F, connected in fluid communication between pump 3 and filtration system 2, and pressure measuring device 9G, connected in fluid communication between filtration system 2 and reservoir 1 where recirculating suspension returns to reservoir 1 from filtration system 2, are each capable of generating a signal corresponding to the pressure of the recirculating suspension flowing through it. Pressure measuring devices 9F and 9G are electrically connected by electrical connections 8E and 8F, respectively, to optional control device 72B which is capable of comparing the signals from pressure measuring devices 9F and 9G to determine the differential pressure across the filtration system 2. The optional control device 72B may be connected to pump 3 via electrical connection 8D for controlling the speed of pump 3 or, optionally, connected to pressure relief valve 9H connected at one end in fluid communication with filtration system inlet 4A and connected at the other end in fluid communication with reservoir 1 via conduit 7H for diverting recirculating suspension back to reservoir 1. Another option is to include in optional control device 72B an alarm which is set off to cause manual intervention when the pressure differential between pressure measuring device 9F and pressure measuring device 9G exceeds a predetermined number.

Reservoir 1 preferably contains an agitator for homogeneously dispersing particles in a suspension. The apparatus of this invention preferably also has a filter screen 9K in fluid communication with reservoir 1, preferably installed between reservoir 1 and pump 3 for filtering out and breaking up particle agglomerations.

These optional features may also be present in the system configurations shown in FIGS. 7, 8 and 9.

Figure 2:
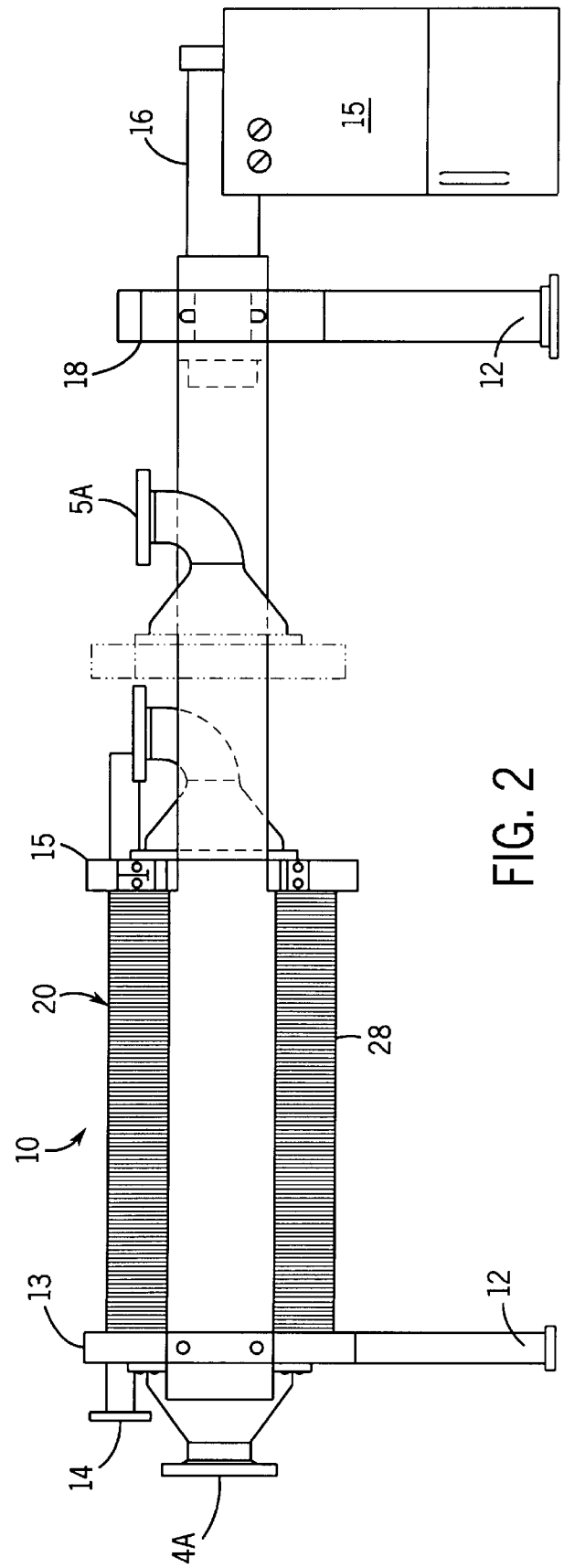
FIG. 2 is a side elevation view of a filtration system known as a Komline-Sanderson Membrane System (KSMS).

The filtration system 2 having the ultrafiltration membrane 2A of FIG. 1 may be illustrated by the exemplary embodiment shown in FIG. 2. FIG. 2 shows a side elevation view of a filtration system 2 manufactured by Komline-Sanderson Engineering Corporation of Peapack, N.J. This system has a filter pack 10 mounted on a stand 12. An inlet static plate 13 abuts the suspension inlet 4A and is carried by stand 12. The static inlet plate 13 acts to contain the liquid I in the filter pack 10. A permeate manifold 14 which carries permeate x also abuts the static inlet plate 13.

The suspension outlet 5A has a dynamic outlet plate 15 which also serves to contain the liquid I in the filter pack 10. However, unlike the static plate 13, the dynamic plate 15 is movable along a track (not shown) mounted to the stand 12. A hydraulic ram 16 pushes the dynamic plate 15 along the track toward the static plate 13 during operation. As the plates 13 and 15 converge, the filter pack 10 is sealed. The stand 12 also carries a hydraulic support plate 18 which in turn supports the hydraulic ram 16.

Figure 3:
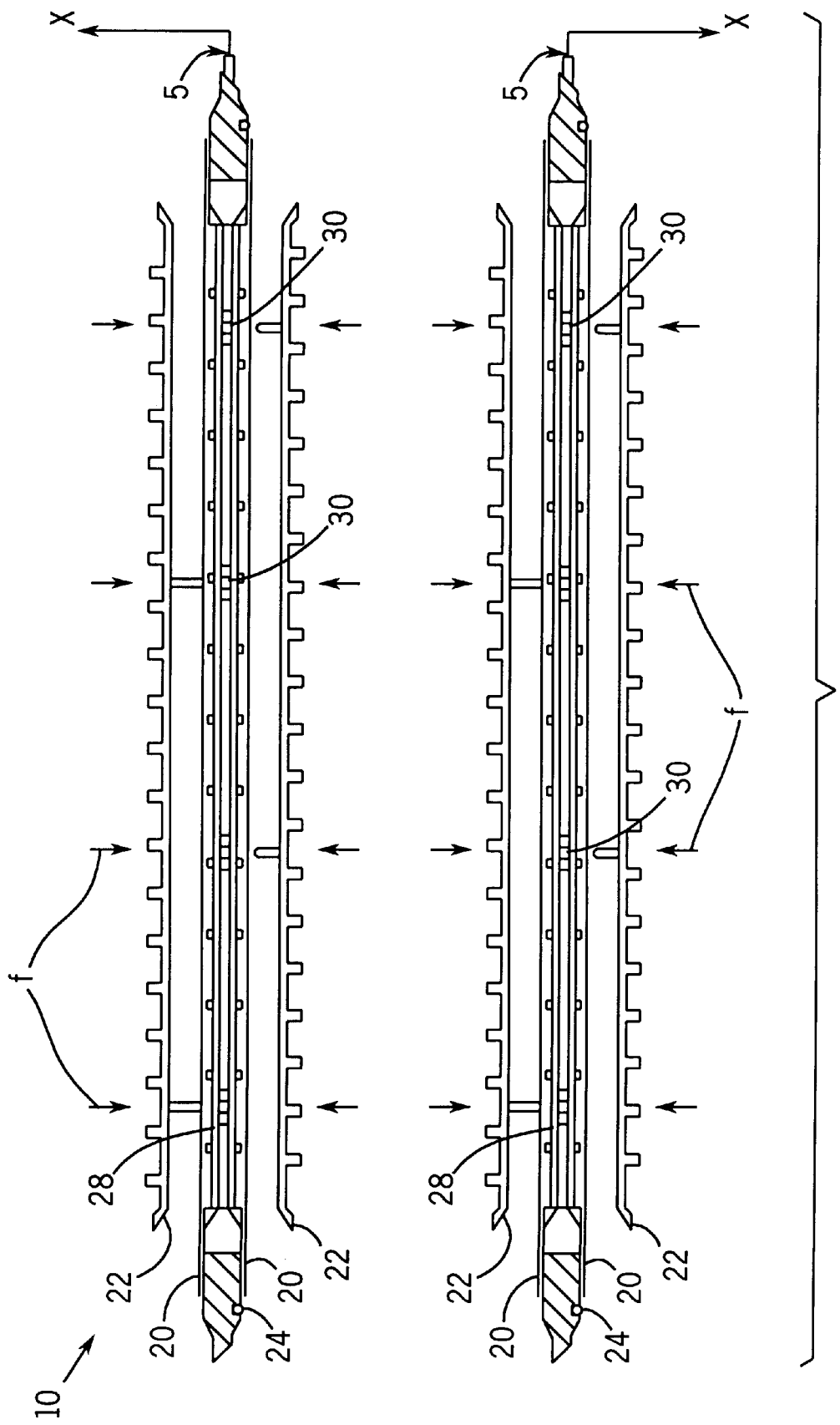
FIG. 3 is an exploded cut away view of a section of the Komline-Sanderson Membrane System (KSMS) filter pack 10 in FIG. 2 comprising two membrane support plates showing the flow of a permeate when the filtration system is in operation.

FIG. 3 is an exploded cut-away view of a section of the filter pack 10 shown in FIG. 2. This filter pack 10 is manufactured by Komline-Sanderson Engineering Corporation of Peapack, N.J. and is known as the Komline-Sanderson Membrane System (KSMS). The membrane 20 is adjacent a pair of strap clips 22 and an O-ring 24 and is supported by a support plate or tray 28. The support plate 28 has a multitude of support plate through slots 30 therein. As the liquid passes into the filter pack 10, a high velocity flux f is created which forces the liquid to pass through a membrane 20. Some of the liquid passes through the membrane 20 and is filtered out of the liquid. This filtered liquid flows out of permeate outlet 5 as permeate x. Some of the liquid does not get filtered by the membrane 20. It passes by the membrane 20 tangentially. This portion of the liquid is known as the retenate.

A more detailed description of the operation of the KSMS filter may be found in U.S. Pat. No. 4,801,381.

Figure 4:
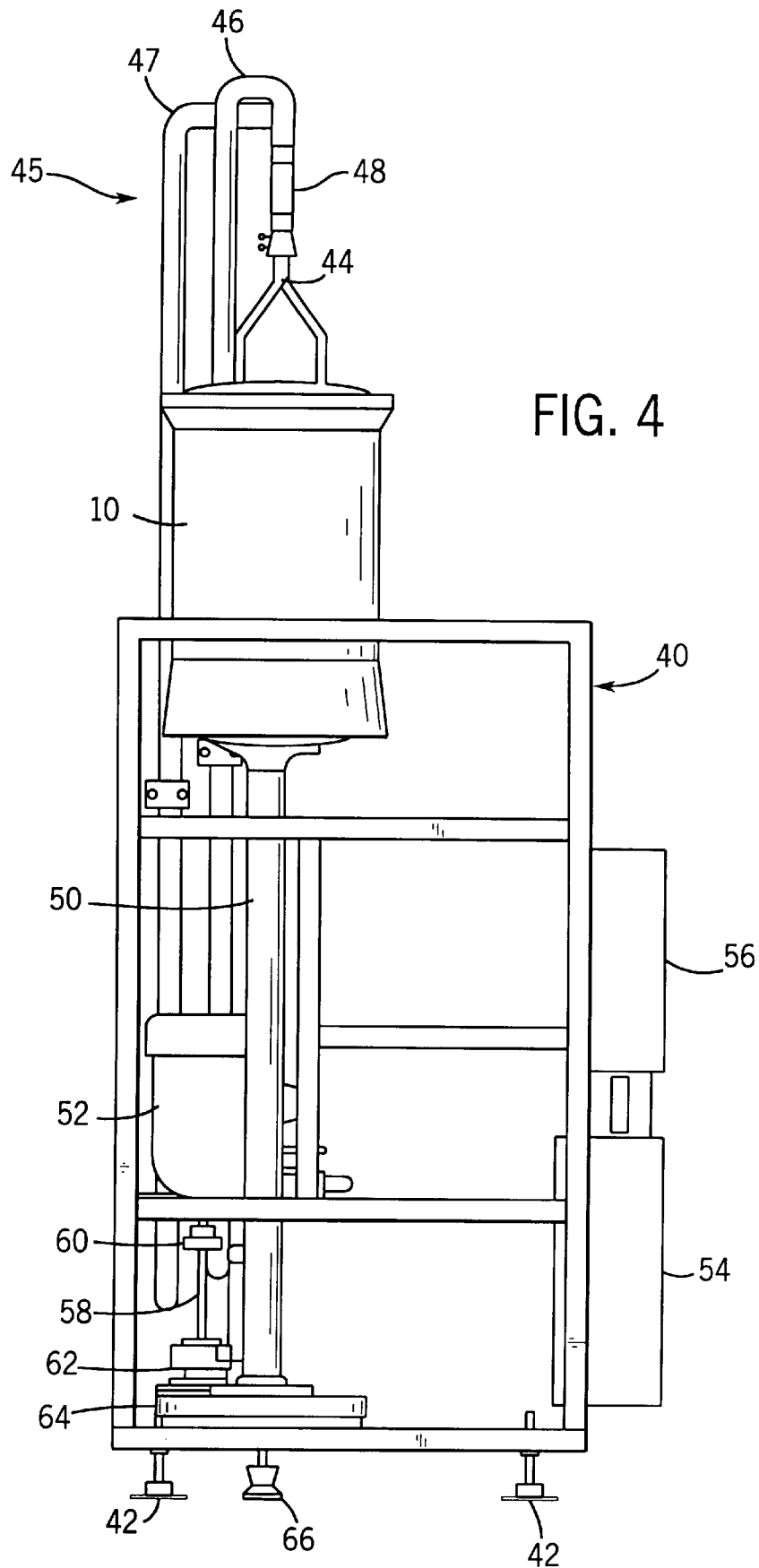
FIG. 4 is a schematic of a filtration system that subjects at least one ultrafiltration membrane to oscillatory motion during filtration, known as V-SEP™.

Alternatively, the filtration system may be a Vibratory Shear Enhanced Processing system (V-SEP™) commercially available from New Logic International of Emeryville, Calif., as shown in FIG. 4. This system has filter pack 10 supported by a tube steel frame 40. The frame 40 rests on the ground upon leveling mounts 42. A tripod piping assembly 44 protrudes out of the top of filter pack 10. Connected to the tripod piping assembly 44 is stainless steel filter pack piping 45 which has both pipes 46 for carrying feed liquid I and pipes 47 for carrying permeate x. The pipes 46, 47 are connected to the tripod piping assembly 44 by a flexible hose coupling 48.

The filter pack 10 is mounted upon a torsion spring 50 that rests upon the frame 40. A vibrator drive motor 52 controls the vibration of the filter pack 10 through the translation of vibration to the torsion spring 50. A vibration drive motor speed controller 54 maintains control over of the vibration speed transferred to the filter pack 10 through the torsion spring 50. Connected to the controller 54 is a control circuitry box 56 which houses the control circuitry of the controller 54.

Figure 5:
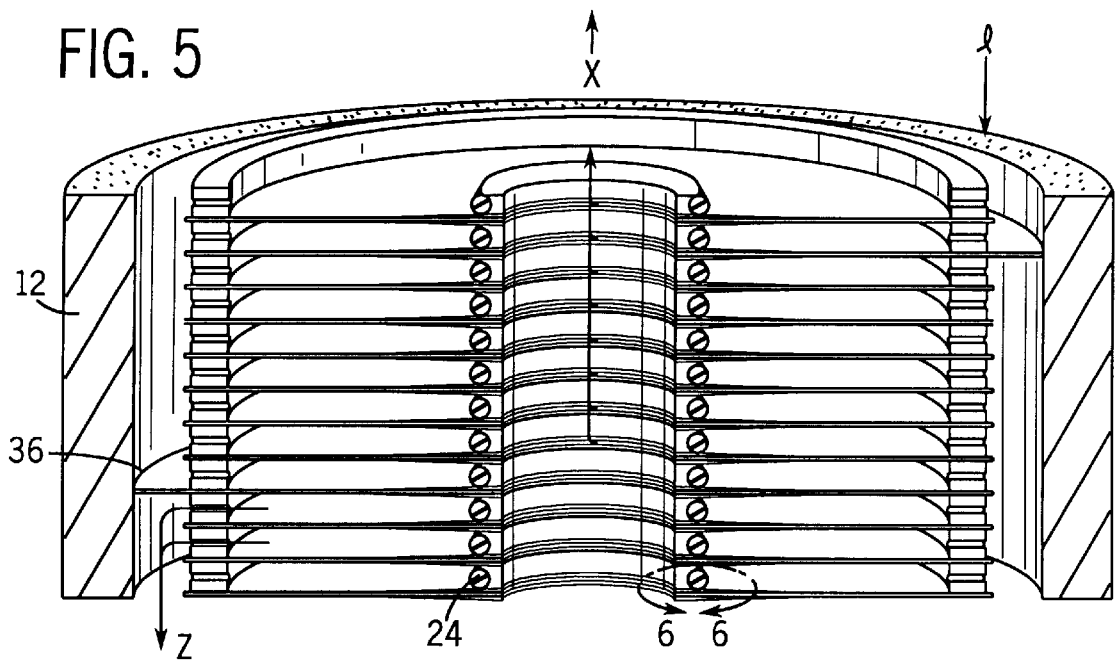
FIG. 5 is a cut away view of a section of the filter pack 10 of the V-SEP™ filtration system of FIG. 4 showing the arrangement of membranes and structural components and the flow of retenate and permeate when the filtration system is in operation.
Figure 6:
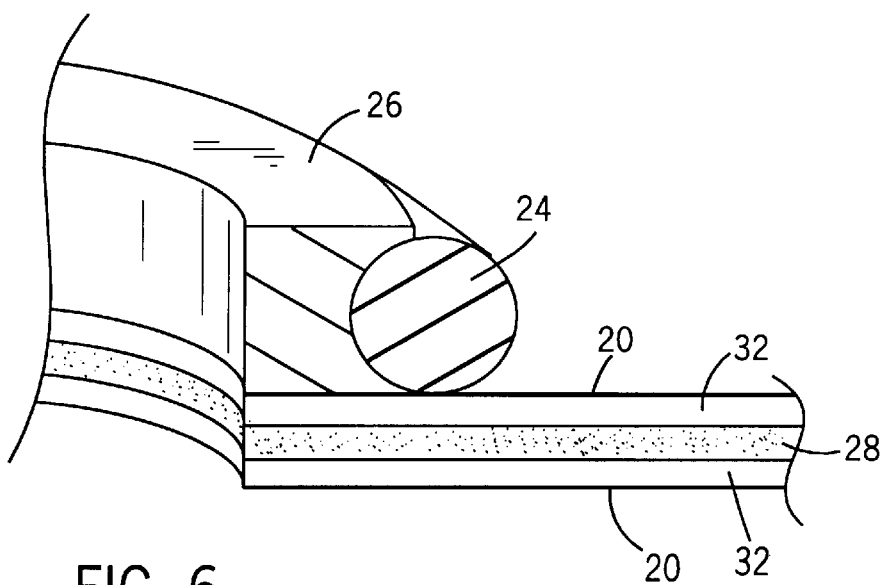
FIG. 6 is an enlarged view of the structure taken along line 5—5 in FIG. 5.

A drive shaft 58 is connected to the drive motor 52 by a flexible coupling 60. The drive shaft 58 is adjacent to an eccentric weight-drive bearing assembly 62. The drive shaft 58 and the torsion spring 50 rest upon a seismic mass 64 which is carried by the frame 40. An isolator 66 is connected to the frame 40 below the seismic mass 66 to dampen unwanted vibration. As shown in FIGS. 5 and 6, the V-SEP™ filter pack 10 has a membrane 20 and then a drain cloth 32 layered on top. Multiple layers of drain cloth 32 may be layered on top. The membrane 20 and the drain cloth 32 of the V-SEP™ filter pack 10 are also carried by a support tray 28. However, another drain cloth 32 is between the support tray 28 and another membrane 20 in the V-SEP™ filter pack 10 which form a filter sandwich as best shown in FIG. 6. A multitude of membranes 20, drain cloths 32, and support trays 28 may be stacked on top of each other in the filter pack 10 for maximum filtration as illustrated in FIG. 5. An O-ring 24, held in place by an O-ring retainer 26, rests between each of the stacked drain cloths 32. A diverter tray 36 lies between the stacked membranes 20 as illustrated in FIG. 5. The diverter tray 36 allows the filter to divert permeate x and retentate z out of the filter pack 10. The membranes, drain cloths, support trays and diverter trays are encased in F.R.P. pipe 37. A more detailed description of the construction and operation of the V-SEP™ filter may be found in U.S. Pat. No. 4,952,317 which is incorporated herein by reference.

The examples which follow are illustrative of the present invention. They are not to be taken as limiting the scope of the claimed invention. Unless stated otherwise, all percentages and ratios of amounts are by weight.

EXAMPLES

The apparatus for conducting the method of this invention is assembled according FIGS. 1 and 9A. Reservoir 1 is a tank with agitator. Filtration system 2 is a Komline-Sanderson unit (designated KSMS in Table III) as shown in FIGS. 2 and 3 and further described below or a V-SEP™ unit as shown in FIGS. 4–6 and also further described below. Pump 3 is a centrifugal pump. Optional components 9A to 9G are included. Components 7H, 8G and 9H are not included.

The method of this invention was carried out using KSMS and V-SEP™ filtration systems. The procedure used with each system is set forth below.

A. Procedure for Purifying Aluminum Hydrate Using KSMS Filtration System

A KSMS is set up with three sections of 36 membrane support plates made of Noryl and polysulfone, each plate carrying two polysulfone membranes for a total of 216 membranes as shown in FIG. 2. Each membrane has a 3121 TYPAR drain cloth between the membrane and the support as shown in FIG. 3. Each membrane has a molecular weight cutoff of 100,000. The total working area of the membranes equals 22.68 m$^2$ (244 square feet). Suspension was pumped into the KSMS at an average pressure of 106 psig and an average temperature of about 22 C.

B. Procedure for Purifying Aluminum Hydrate and Aluminum Lake Using V-SEP™ Type Filtration System A V-SEP™ is set up with a Series L filter pack as shown in FIGS. 4–6. The filter pack membranes have a molecular weight cutoff of 100,000 and a working area of 300 square feet. The aluminum hydrate is pumped into the filter pack at an average pressure of 106 psig and an average temperature of about 26 C. and the aluminum lake is pumped at an average pressure of about 102 psig and an average temperature of 25 C. The V-SEP™ unit is set to vibrate the membranes at an average amplitude of about 1 inch at an average rate of about 55 cycles/second.

C. Purification of Aluminum Hydrate and Aluminum Lake

Data on purification of aluminum hydrate and aluminum lake using procedures A and B is provided in Table III below. The aluminum hydrate and aluminum lake samples are prepared according to the process described above.

TABLE III

Purification of Aluminum Hydrate and Aluminum Lake

| | Filtration System | KSMS | V-SEP ™ | V-SEP ™ |
|---|---|---|---|---|
| Steps | Product | Aluminum Hydrate | Aluminum Hydrate | Aluminum Lake (Yellow No. 5) |
| Start | % Solids | 2–3 | 2–3 | 6–8 |
| | Volume 1 | 3.2 | 3.2 | 1.8 |
| | Conductivity (mS) | 38,200 | 39,000 | 40,300 |
| Conc. Step 1 | Time (hours) | 1.58 | 1.59 | 3.90 |
| | Average Permeate Flow Rate/Hr | 1.0 | 0.6 | 0.4 |
| Purification Step | Time (hours) | 6.23 | 8.41 | 25.01 |
| | Average % Solids | 6.2–6.8 | 6.2–6.8 | 8.6–9.4 |
| | Volume 2 | 1.6 | 1.6 | 1.3 |
| | Average Permeate Flow Rate/Hr | 1.0 | 0.4 | 0.3 |
| | Volume of Water Injected | 6.0 | 3.8 | 8.1 |
| | Water: Solids Weight Ratio | 57:1 | 36:1 | 70:1 |
| | Water: Permeate Volume Ratio | 1.0 | 1.1 | 1.1 |
| | Final Conductivity of Permeate (mS) | 1900 | 1800 | 1500 |
| Conc. Step 2 | Time (Hours) | 1.62 | 3.70 | 2.87 |
| | Average Permeate Flow Rate/Hr | 1.0 | 0.3 | 0.3 |
| Product Recovered | Total Oper. Time (Hours) | 9.41 | 13.70 | 31.78 |
| | % Solids | 10–11 | 10–11 | 11–12 |
| | Volume 3 | 1.0 | 1.0 | 1.0 |

Surprisingly, the amount of water required to purify a given amount of particles in suspension (i.e., the water to solids weight ratio) ranges from 36:1 to 70:1 while the average press using the prior art filter press method typically has a water to solids weight ratio of at least 100:1 to achieve the same purity. The method of this invention has a further advantage that purification can be carried out with a small number of steps and the entire process can be automated.

Although the process of this invention has been described in considerable detail by the preceding examples, this detail is for the purpose of illustration only and is not to be construed as a limitation on the spirit and scope of the invention as described in the append claims.

What is claimed is:

1. A method for purifying a fluid aqueous suspspension of aluminum hydrate particles, or aluminum lakes formed therefrom, containing one or more water-soluble impurities, the method comprising the steps of:
   A. continuously recirculating the fluid aqueous suspension between a filtration system and a suspension reservoir;
   B. continuously conducting ultrafiltration of the recirculating fluid aqueous suspension at the filtration system to separate an aqueous permeate containing the water-soluble impurities from the recirculating fluid aqueous suspension;
   C. continuously discharging the permeate generated by step B;
   D. adding water to the recirculating fluid aqueous suspension undergoing ultrafiltration at approximately the same volumetric rate per hour as permeate is being discharged according to step C;
   E. monitoring the purity of the recirculating fluid aqueous suspension; and
   F. recovering the purified fluid aqueous suspension produced by steps A through D after the recirculating fluid aqueous suspension has reached a predetermined purity condition monitored according to step E, wherein the method further comprises:
      using a pump urging the fluid aqueous suspension from the suspension reservoir to the filtration system to continuously recirculate the fluid aqueous suspension according to step A and conducting step D between the suspension reservoir and the pump such that the added water enters the pump before entering either the filtration system or the suspension reservoir; and wherein the method optionally comprises the further steps of:
   G. combining the aqueous suspension purified according to steps A to E with a dye to form an aluminum lake; and
   H. conducting steps A to F with the aluminum lake as the fluid aqueous suspension to obtain purified aluminum lake.

2. The method according to claim 1 wherein ionic salts comprise at least 50 weight percent of the water-soluble impurities removed from the suspension, the monitoring step E is conducted by monitoring the conductivity of the permeate, and the predetermined purity condition of step F is less than 2,000 microSiemens/cm.

3. The method according to claim 2 wherein the conductivity of the permeate is reduced by at least 35,000 microSiemens/cm and the total amount of water added to the recirculating fluid aqueous suspension to reach the predetermined purity condition of step F to the total weight of the particles in the same is less than 50:1.

4. The method according to claim 3 wherein the filtration system is not a vibratory filtration system and comprises an ultrafiltration membrane, an ultrafiltration membrane support and a drain cloth interposed between the ultrafiltration membrane and the ultrafiltration membrane support.

5. The method according to claim 4 wherein the predetermined purity condition of step F is less than 1,200 microSiemens/cm.

6. The method according to claim 5 wherein sodium salts comprise at least 40 weight percent of the water-soluble impurities removed from the suspension.

7. The method according to claim 3 wherein the method consists of steps A to E until the conductivity of the permeate is less than 2,000 microSiemens/cm before conducting steps G and H and then conducting steps G and H.

8. The method according to claim 7 wherein steps G and H are conducted until the conductivity of the permeate is less than 1,200 microSiemens/cm.

9. The method according to claim 8 wherein the aluminum lake is a certifiable FD&C, D&C or E.E.C. aluminum lake.

10. The method according to claim 8 wherein the aluminum lake is a natural color aluminum lake.

11. The method according to claim 8 wherein sodium chloride and/or potassium chloride comprises at least 40 weight percent of the water-soluble impurities removed from the aluminum lake suspension.

12. The method according to claim 1 wherein the filtration system is not a vibratory filtration system and comprises an ultrafiltration membrane, an ultrafiltration membrane support and a drain cloth interposed between the ultrafiltration membrane and the ultrafiltration membrane support.

13. The method according to claim 1 wherein the method consists of steps A to E until the conductivity of the permeate is less than 2,000 microSiemens/cm before conducting steps G and H, then conducting step G in the suspension reservioir and then conducting step H.

14. The method according to claim 13 wherein the aluminum lake is a certifiable FD&C, D&C or E.E.C. aluminum lake.

15. The method according to claim 13 wherein the aluminum lake is a natural color aluminum lake.

16. The method according to claim 1 wherein the aluminum lake is a certifiable FD&C, D&C or E.E.C. aluminum lake.

17. The method according to claim 1 wherein the aluminum lake is a natural color aluminum lake.

18. The method according to claim 1 wherein the filtration system comprises at least one ultrafiltration membrane capable of separating a permeate fraction containing the water-soluble impurities from the fluid aqueous suspension.

19. The method according to claim 18 wherein the membrane is subjected to oscillatory motion during filtration.

20. The method according to claim 19 wherein the oscillations have an amplitude of at least 0.75 inch and a frequency of at least 45 cycles/second.

21. The method according to claim 1 wherein the water added in step D has a conductivity less than 600 microSiemens/cm.

22. The method according to claim 1 wherein the recirculating fluid aqueous suspension is at a temperature in the range from 5 C. to 35 C.

23. The method according to claim 1 wherein the suspension has a solids concentration in the range from 5 to 10 percent.

24. The method according to claim 1 which further comprises concentrating the suspension according to a process comprising steps A to C prior to adding water to the recirculating suspension according to step D.

* * * * *

UNITED STATES PATENT AND TRADEMARK OFFICE
CERTIFICATE OF CORRECTION

PATENT NO. : 6,123,848
DATED : September 26, 2000
INVENTOR(S) : Rosa Isabel Quebons Dominguez; Lance Eugene Solter; Danny Thomas Lauff; John David Mitchell; Edward Charles Jantosik, Jr., David Carl Woodward It is certified that error appears in the above-identified patent and that said Letters Patent is hereby corrected as shown below:

Column 1, line 21: Replace "have-uses" with --have uses--.

Column 1, line 59: Replace "is-that" with --is that--.

Column 2, line 11: Replace "World. Health Organization" with --World Health Organization--.

Column 4, line 62: Replace "herein," with --herein--.

Column 5, line 30: Replace "cellulose, derivatives" with --cellulose derivatives--.

Column 16, line 13: Replace "supspension" with --suspension--.

Column 17, line 34: Replace "reservioir" with --reservoir--.

Signed and Sealed this

Fifteenth Day of May, 2001

*Attest:*

NICHOLAS P. GODICI

*Attesting Officer*   Acting Director of the United States Patent and Trademark Office